A. L. MAXWELL.
DEVICE FOR TEACHING MUSIC.
APPLICATION FILED SEPT. 15, 1916.

1,337,937.

Patented Apr. 20, 1920.
4 SHEETS—SHEET 1.

Witnesses

Inventor
A. L. Maxwell,
By Victor J. Evans
Attorney

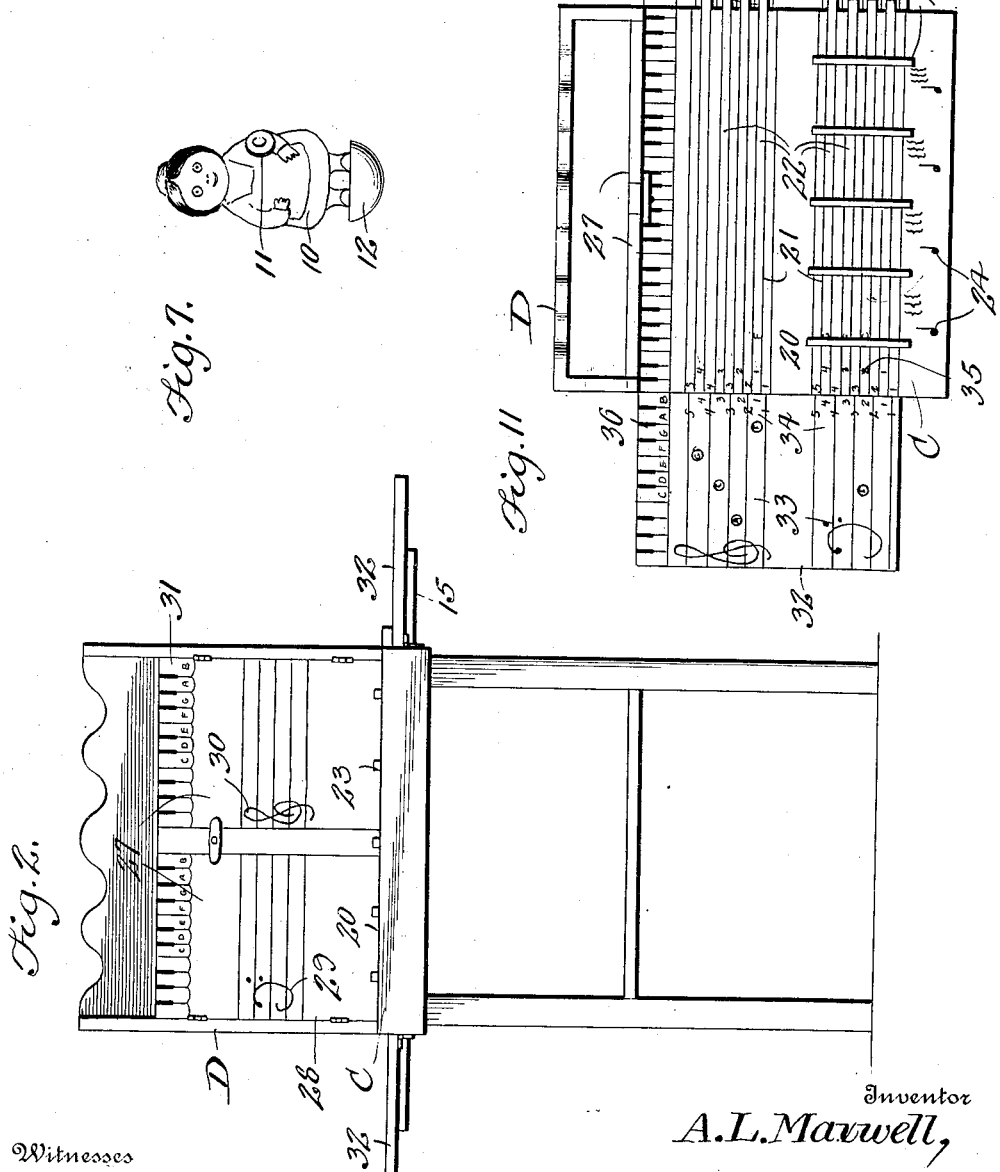

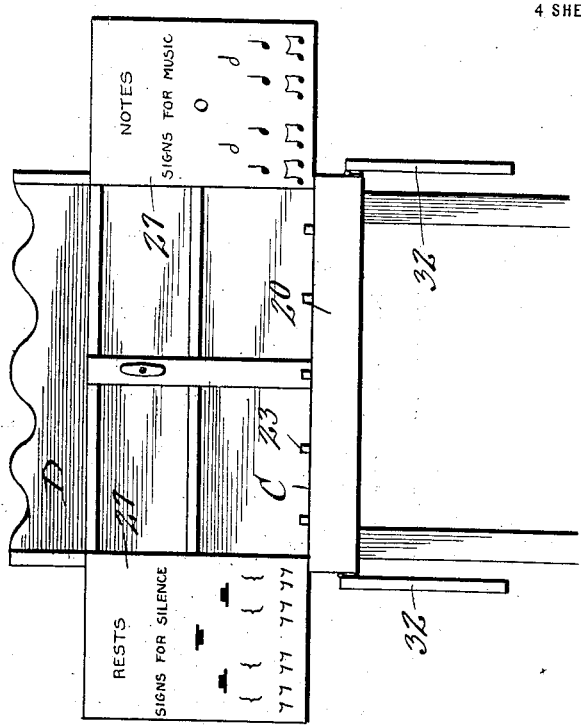
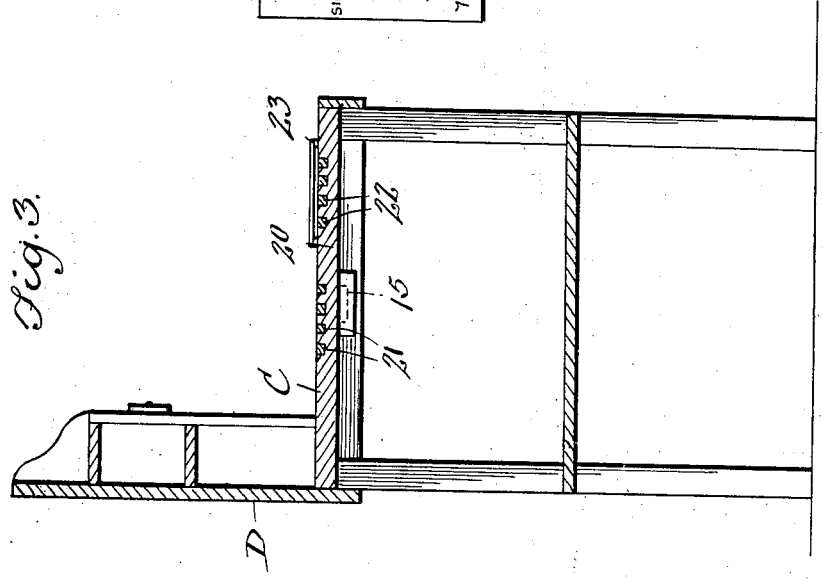

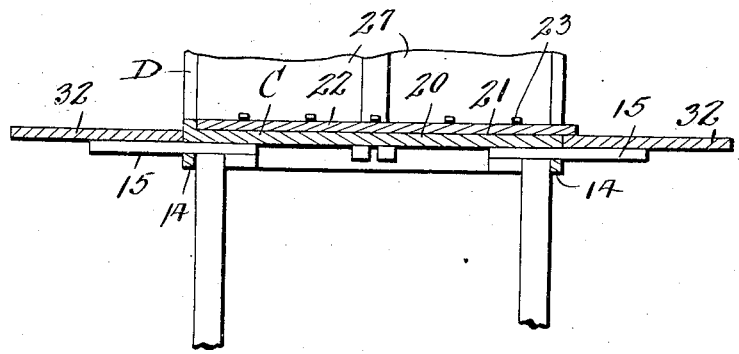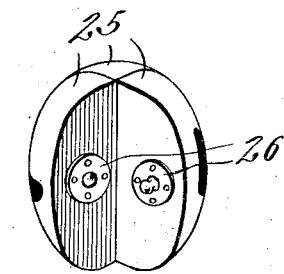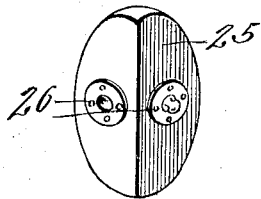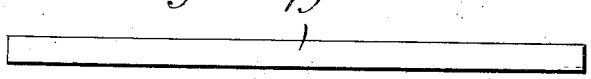

UNITED STATES PATENT OFFICE.

ANNIE L. MAXWELL, OF WACO, TEXAS.

DEVICE FOR TEACHING MUSIC.

1,337,937.  Specification of Letters Patent.  Patented Apr. 20, 1920.

Application filed September 15, 1916. Serial No. 120,375.

*To all whom it may concern:*

Be it known that I, ANNIE L. MAXWELL, a citizen of the United States, residing at Waco, in the county of McLennan and State of Texas, have invented new and useful Improvements in Devices for Teaching Music, of which the following is a specification.

This invention relates to music-instructing devices, and has for its object the provision of a device designed principally for teaching children in kindergartens the positions of the notes on a piano keyboard by means of differently dressed puppets or dolls bearing the name of a note and disposable upon the representation of a staff, the dolls being of different sizes to indicate quarter, half or full notes.

A further object of the invention is the provision of a device for teaching the different "rests" and the rudiments of "time".

In carrying out my invention I employ a table upon the surface of which are lines representing the bass and treble staffs, while arranged rearwardly of the staffs is the representation of the key board of a piano. To represent musical characters of different kinds, I employ a number of puppets or dolls of various sizes with costumes of various colors, having imprinted thereon or attached thereto their respective musical character and key letter. The puppets are adapted to be placed upon the staff and key board in positions corresponding to the character on the puppets. I having devised different methods of teaching the children the proper position of the notes by relating stories and moving the puppets from the staffs to the keyboard, to follow the action told in the story. It will be seen that by employing puppets having costumes of different colors that the pupils will become keenly interested as children have a natural tendency to handle and move dolls. By using the dolls in the above described manner, the pupils will become thoroughly familiarized with the relative positions of the different musical characters upon the key board and staffs.

Another object of this invention is to provide means associated with the table for instructing children in the principles of harmony in a manner similar to the above described means for identifying the notes and keys.

Another object of the invention is to provide an auxiliary table having a series of movable strips mounted thereon adapted to represent the lines of a staff in connection with which I use a series of musical characters in the form of sectional wooden members which are so constructed and painted as to represent apples, the strips and sectional members coöperating with each other to demonstrate in a clear and concise manner notes of different time lengths Other objects of this invention will appear as the specification is read in connection with the accompanying drawings, in which:—

Fig. 2 is a front elevation of a modified form of my invention showing the two doors of the cabinet in closed position.

Fig. 3 is a vertical central section of Fig. 2.

Fig. 4 is a front elevation of the form shown in Fig. 2 with the door open and the leaves dropped.

Fig. 5 is a longitudinal sectional view of Fig. 2.

Fig. 6 is a detail view of the sectional musical character, showing one of the sections detached.

Figure 1:
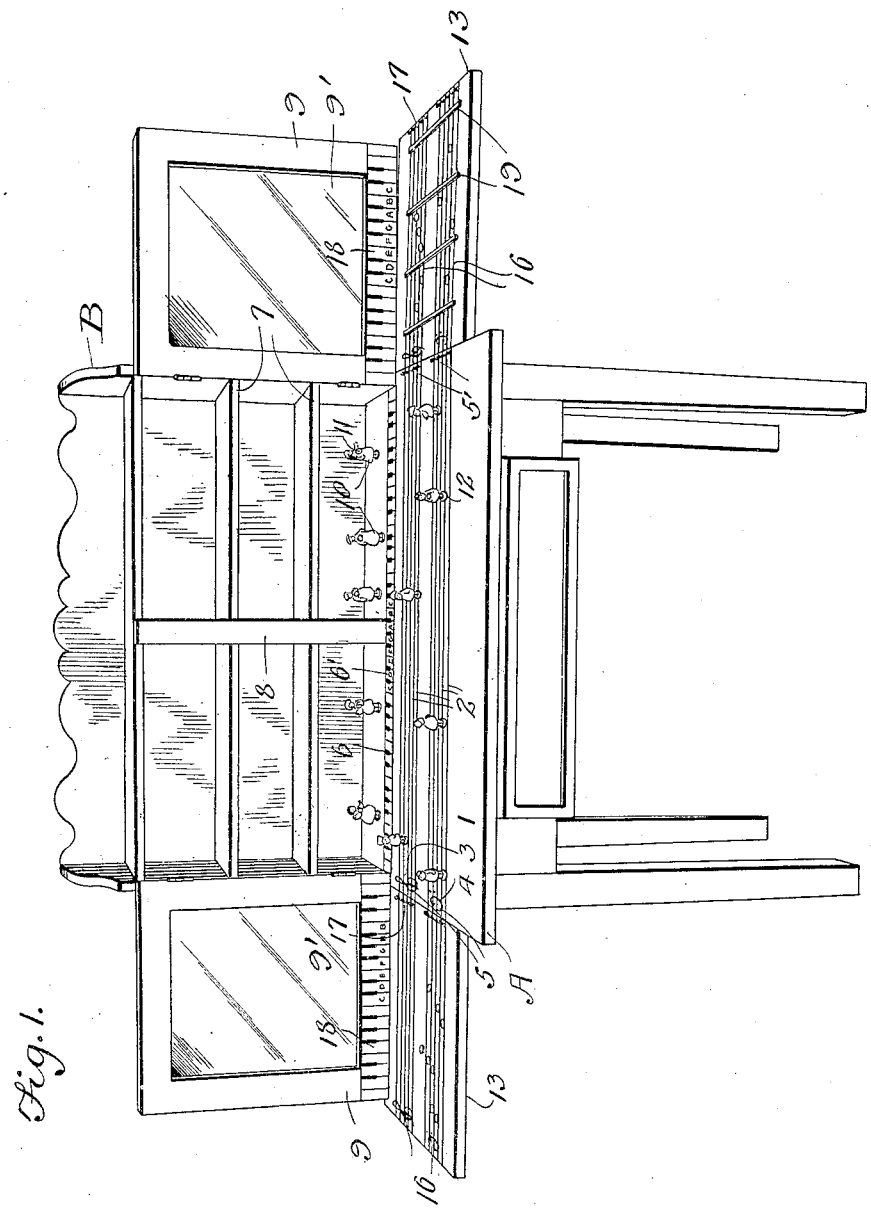
Figure 1 is a perspective view of the preferred form of my invention showing the hinged leaves of the table top and the doors of the cabinet in open position.

Fig. 7 is a detail view of one of the puppets, and Fig. 8 of another. Fig. 9 is a detail of one of the disks, and Fig. 10 of one of the strips. Fig. 11 is a plan view of Fig. 2.

Referring to the drawings in detail, and first to Fig. 1 my invention comprises in this instance a table generally indicated at A which is provided with a flat top 1. Imprinted or otherwise inscribed upon the surface of the top 1 and extending longitudinally of the same are two series of lines 2 which indicate the treble staff 3 and bass staff 4 respectively, they being provided with their clef signs at one end thereof as at 5, while upon the opposite end at 5' are the letters of the lines and spaces. The bass and treble staffs 3 and 4 are preferably arranged at the forward part of the table top while disposed rearwardly thereof is the representation of a piano key board 6, the key board being provided at its medial portion with indicia 6' representing the letters of certain keys. Disposed at the extreme rear edge of the table top and upstanding therefrom is a cabinet generally indicated as at B which is provided with a series of shelves 7, the shelves being divided into two compartments by means of a vertically extending strip 8. Arranged upon the opposite ends of the cabinet B are a pair of hingedly mounted doors 9 which preferably have transparent panels 9' each of the doors being adapted to close its respective compartment as will be understood. The cabinet B is adapted to receive the puppets when the same are not in use upon the table as will be hereinafter described.

In connection with the bass and treble staffs 3 and 4 and the piano key board 6 I use a series of indicators shown in Figs. 1, 7 and 8 as puppets or dolls 10 of different sizes with costumes of different colors which are designed to represent musical characters and are to be placed upon the staffs and key board as will be explained. Each puppet is designed to represent a particular note and is provided with paper disks 11, one arranged upon the head of the puppet and having the note imprinted thereon, the remaining disk being secured to the front of the puppet and having a letter thereupon. In this embodiment of my invention I have formed the puppet of celluloid or other light material, mounted upon and secured to a hemispherical base 12 of some heavier material such as metal or the like, whereby the puppet will be caused to assume a vertical position at all times. It is to be understood that I do not confine myself to this specific construction of puppet, as any form of puppet may be used without departing from the spirit of this invention.

In practice the puppets are placed upon each or both of the staffs as the teacher may elect, the letters on the puppets indicating their proper positions upon the staff and the letters at the end of the staff assisting the teacher in placing the puppets thereupon. The latter may be moved from their positions upon the staffs to corresponding positions upon the key board 6 and if desired subsequently to the staffs, thus clearly demonstrating to the children the respective positions of the notes upon the staffs and key board. In order to more strongly impress the positions of the musical characters upon the children it has been found in practice that by relating a story in connection with the moving of the puppets in which the puppets assume the different characters in the story, the children will more readily grasp and display a keener interest in the moving of the puppets and will unconsciously learn the positions of the musical characters. I suggest the relating of the story with the movements of the puppets as one form of teaching the positions of the notes upon the staffs and key board, but it will be understood that any means may be employed in connection with the puppets to obtain this end. In employing puppets of various sizes, I propose to have the larger puppets indicate notes of greater length than the smaller puppets whereby upon combining puppets of different sizes or closely associating them upon the staff as one behind the other, I may indicate that the note is of a length corresponding to the combined note lengths of the puppets. It is to be understood that when assembling puppets of different sizes to indicate the length of a note, one of the puppets is without the disks 11 to indicate the character of the note which the puppet represents, so that the child will not be confused. By providing the different puppets with different colored costumes, the task of teaching a child the difference between the notes they indicate will be simplified, as will be obvious.

Hingedly connected to the opposite ends of the table top 1 are a pair of leaves 13 which are mounted for outward swinging movement and which when in active position lie horizontally and flush with the table top 1. To support the leaves in horizontal position, I secure to the under side of the table top a pair of brackets 14 through which are slidably mounted a pair of rods 15. When the rods are projected beyond the ends of the table top, they engage the under side of the leaves and thereby hold the same in horizontal position. It is to be understood that when the rods 15 are retracted so as to disengage the leaves 13, the leaves may swing into vertical position against the side of the table. The leaves 13 have their upper surfaces provided with a series of longitudinally extending lines forming the bass and treble staffs as indicated at 16. These staffs are provided with the usual clef marks at their left ends and bear at their right ends indicia 17 such as letters on the lines of each of the staffs. Mounted or inscribed upon the inner face of each of the doors 9 and disposed upon the lower cross bar thereof is the representation of a piano key board 18, or rather a portion thereof, each door being provided with the letters of a scale. As shown in Fig. 1, when the doors are in open position the key boards 18 will be disposed in parallelism with the staffs 16 upon the leaves, whereby the pupils may readily see the relative positions of the notes upon the key board and upon the staffs. The leaf 13 upon the left end of the table is intended for the instruction in the principal chords in harmony. In connection with the staffs upon the leaf at the left end of the table I use either the disks 11 or the puppets 10 for demonstrating to the pupils the exact position of the notes of the principal chords in harmony. The leaf upon the right end of the table top is designed for teaching the time values of different musical characters. On this leaf I have shown the staff subdivided into bars by means of the transversely extending strips 19. Various combinations of notes within the bars may be made by the use of the disks or puppets for clearly demonstrating to the pupils the different and relative values of the notes, the key board upon the adjacent door being designed to assist the teacher in familiarizing the pupils with the positions of the notes upon the staff and the key board.

Referring more particularly to the remaining figures I have shown a table generally indicated as at C for demonstrating the principles of time. The top 20 of the table C is provided with a series of spaced longitudinally extending grooves 21, arranged in series of fours, the spaces between the grooves being painted black to indicate the lines of the staff, it being understood that I provide two staffs arranged in spaced relation to each other, as is clearly shown in Fig. 11 of the drawings. The grooves 21 are adapted to receive strips 22 which are formed of any suitable material such as wood or the like and which have their upper surfaces painted white to clearly distinguish them from the lines of the staff, it being understood that the strips 22 represent the spaces of the staff. The strips 22 are slidably mounted within the grooves and normally project beyond the end of the table whereby the teacher may grasp the respective strips to move them in or out of the grooves as the occasion may demand, and thereby attract the pupil's attention to a particular strip or strips or the staff space or spaces formed by the strip or strips. Each of the staffs is adapted to be subdivided into measures, by the transversely extending strips 23. The remaining staff which is arranged adjacent the rear edge of the table top is not provided with the cross strips 23 but at the same time may be used for demonstrating the different length of notes within a measure.

In connection with each of the measures I use sectional indicators 25 which in this instance are globes composed of four quarter sections to represent the four quarter notes in a whole note, the globes being so shaped and painted as to represent an apple. The sections have their inner confronting faces provided with stud and socket fasteners 26 whereby the sections may be detachably connected to each other to form the apple. The outer surface of each of the sections has the representation of a quarter note thereupon whereby the teacher may demonstrate in a clear and concise manner the fractional value of a whole note. The indicators 25 are adapted to be used in connection with the movable strips 22, the former serving to indicate the length of a note by detaching some of the sections thereof to indicate the desired note and placing the section upon the staff. Assuming that half notes or two of the sections have been placed adjacent one of the measures, one of the strips is withdrawn half of its length thus disposing its inner end at the second bar of the measure and indicating to the pupil that the note is to be sustained for one-half of the length of the measure. In providing each of the staffs with four movable strips, the lengths of four notes may be indicated by the respective positions of the strips as will be understood.

In connection with this table I use a cabinet D which is of a structure similar to that of the cabinet B shown in Fig. 1, with the exception that the doors 27 are not provided with transparent panels but are made nontransparent and have their outer faces provided with a blackboard 28 upon which is scored a series of lines representing the bass and treble staffs provided with the clef marks 29 and 30 respectively, one upon each of the doors as is clearly shown in the drawings. These staffs are arranged at the medial portion of each of the doors while adjacent the upper edge of each of the doors is the representation of a key board of a piano as indicated at 31, the key boards having the letters of the keys thereon as in my preferred form. The blackboard 28 is designed for the purpose of demonstrating the different lengths and positions of the musical characters upon the staffs in both the treble and bass staffs, the key boards being adapted to assist the pupils in determining the positions of the musical characters shown on the staffs and upon the key board of a piano. The inner faces of the doors 27 are provided with indicia for demonstrating time in music, one of the doors having the different rests, so arranged as to show their relative lengths. The remaining door has its inner surface provided with the different notes so arranged as to indicate the relative lengths of the notes as is clearly shown in the drawings.

The table C is provided at its opposite ends with the hinged leaves 32 as shown in my preferred form and also has similar means for supporting the leaves in horizontal position at the ends of, but a little below, the level of the table top so that the doors 27 may swing over the leaves and will clear strips which may lie thereon. The upper surface of each of the leaves is provided with bass and treble staffs as indicated at 33, each of the staffs being provided with letters 34 arranged upon the spaces and lines to indicate the notes. To further assist the pupils in learning the positions of the musical characters upon the staffs, I have numbered each of the lines of the respective staffs upon the leaves and upon the table top as at 35, the lines being numbered from 1 to 5 and the spaces from 1 to 4 as is clearly shown in the drawings. In connection with the leaves 32 I may use the disks 11 or the puppets 10 for demonstrating to the pupils the positions and names of the musical characters. To further assist the pupils in determining the positions of the notes upon the keyboard of a piano I have provided the leaves 32 upon their upper faces and adjacent their rear edges with the representation of the keyboard of a piano as indicated as at 36.

It will thus be seen that my modified form is designed primarily for demonstrating the lengths of notes and rests and may be used in connection with my preferred form whereby the pupils may obtain a thorough knowledge of the fundamental principles of music without apparent mental effort.

It is thought from the foregoing taken in connection with the accompanying drawings that the construction and operation of my device will be apparent to those skilled in the art without further description, and that minor changes in size, shape, proportion and minor details of construction may be made without departing from the spirit and scope of the appended claims.

What I claim is:

1. In a device for teaching music, a table, a staff inscribed upon the table, a representation of a key board, inscribed upon said table, leaves hinged upon the ends of the table and movable to be parallel therewith and inscribed with staffs; a support on the rear of and projecting above said table, panels hinged upon said support and swingable to extend above and into alinement with the rear edges of said leaves, the inner sides of said panels being inscribed with the representation of a key board, in combination with members movable upon the staffs and indicating keys on the key board and positions on the staff.

2. In a device for teaching music, a table having its top inscribed with staffs and the representation of a key board, and a plurality of puppets of contrasting sizes, colors and shapes, each indicating the value of a note and the location thereof on said staff and bearing indicia indentifying the corresponding key on said key board.

3. In a device for teaching music, a table having a staff inscribed upon its top and also having a plurality of spaced grooves between the lines of said staff, strips slidable inwardly and outwardly in said grooves, and note-indicating members divisible into parts; said slidable strips being withdrawable partly from said grooves, for the purpose set forth.

4. In a device for teaching music, a table having in its top a plurality of spaced grooves, the spaces between the grooves being utilized to define the lines of a staff, and strips slidable inwardly and outwardly in said grooves in combination with note-indicating members; said slidable strips being withdrawable partly from said grooves, for the purpose set forth.

In testimony whereof I affix my signature.

ANNIE L. MAXWELL.